3,583,945
MERCURY CATALYSTS FOR PREPARATION OF URETHANES
Janis Robins, St. Paul, Minn., assignor to Minnesota Mining and Manufacturing Company, St. Paul, Minn.
No Drawing. Division and Continuation-in-part of application Ser. No. 41,153, July 6, 1960. This application June 4, 1962, Ser. No. 199,644
Int. Cl. C08g 22/40
U.S. Cl. 260—77.5AB                                8 Claims

ABSTRACT OF THE DISCLOSURE

Monoorgano mercuric compounds are used as catalysts in the urethane linkage forming reaction between isocyanate and hydroxyl groups.

---

This invention relates to new and useful solid non-cellular urethane polymers, particularly elastomers or rubbers, and to the method of their production. In accordance with this invention cross-linked, solid, non-cellular urethane polymers, particularly rubbers or elastomers are prepared by reacting liquid mixtures of organic polyisocyanates and hydroxy terminated polyols in the presence of polyol soluble ionizable halogen-free divalent mercury compounds.

This application is a division and continuation-in-part of my earlier filed copending application Ser. No. 41,153, filed July 6, 1960 and now abandoned.

The discovery that liquid mixtures of monomeric organic polyisocyanates and polyhydroxy terminated polyols could be made to cure in a single stage to substantially completely reacted stable solid urethane elastomers when reacted in the presence of soluble compounds of certain metals, e.g. tin, antimony, bismuth, arsenic, and, more recently, lead, has opened new avenues for the application and use of urethane rubbers. As these rubbers cure readily from liquid mixtures under ambient conditions without heat or pressure they are freed from many of the processing and application restrictions previously associated with rubber technology. For example, these rubbers can be formed in situ against cloth, leather, paper, ceramics, metal, plastics and other substrates without requiring heat, pressure, or additives to "finish off" the curing of the rubber.

However, the development of these new, solid, i.e., non-cellular, one-shot urethane polymers utilizing previously known soluble metal compound catalysts has been hampered by the extreme sensitivity of the polymer forming reaction to even very small quantities of water, in or in contact with the liquid reaction mixture during curing; thus, the reaction mixture components have had to be maintained in a substantially completely anhydrous state prior to mixing, during mixing and thereafter while curing to assure any uniformity of product. Water competes with the hydroxyl groups for reaction with the isocyanate groups in the reaction mixture and, when the competition is between secondary hydroxyl groups (as is usual) and water, the water-isocyanate reaction is favored. Thus, in place of urethane linkages, an excess of urea or other linkages are formed, with release of carbon dioxide causing bubbling, or otherwise resulting in rubbers having inferior physical properties. Unfortunately, prior known soluble metal catalysts have been found to either indiscriminately promote the water-isocyanate reaction as well as the hydroxyl-isocyanate reaction, or to be inhibited by water.

A moisture content of as little as $\frac{1}{10}$ of 1% of the weight of the reaction mixture may have a profound effect on the resulting product. Since moisture can enter the reaction mixture as a residual contaminant of the polyhydroxy containing component of the system, as water of hydration, as water of absorption in a filler, or other additive, or from the humidity of the environment in which the reaction is carried out, or from the surface against which the polymer is to be cast in situ, or from a myriad of other sources, guarding against undue moisture content to assure uniform quality in solid polymer production has been a continuing problem.

While stable bubble-free elastomers are consistently possible utilizing lead compounds of the kind disclosed in application Ser. No. 41,153, supra, e.g. lead salts of carboxylic acids, as catalysts since the lead compounds unlike other prior known catalysts, promote the secondary hydroxyl-isocyanate reaction while having little accelerating effect on the water-isocyanate reaction, the catalytic activity of the lead compounds is inhibited by the presence of water or free acid. Thus, the formation of free acid, or the presence of water, during storage of the polyol component in which the catalyst is usually dissolved before mixing with the polyisocyanate, or in the presence of the reaction mixture, results in the formation of elastomers having unpredictable cure times and final properties.

While the mercuric compounds, particularly the organo-mercuric compounds, appear to catalyze the water-isocyanate reaction as well as the secondary hydroxyl-isocyanate reaction when these reactions are carried out separately, it has been found, surprisingly, that when these reactions are carried competitively in the same mixture in the presence of divalent mercury compounds in accordance with this invention the hydroxyl-isocyanate reaction is promoted apparently to the substantial exclusion of the water-isocyanate reaction and without inhibition of catalytic activity.

It is thus an object of this invention to react liquid mixtures of polyisocyanates and certain types of polymeric polyols in the presence of organic polyol soluble ionizable compounds containing divalent mercury and to thereby inhibit undesirable side reactions with water to a degree not heretofore possible. It is a further object to provide a long term storage stable liquid polyol component for subsequent reaction with a polyisocyanate, which polyol component contains dissolved therein an ionizable compound of divalent mercury. It is another object to provide liquid urethane reaction mixtures wherein the time for completion of the reaction is less temperature dependent, and wherein the time for mixing the reactants is lengthened without lengthening gel time, as compared to prior known "cold curing," i.e. ambient temperature ($35°+100°$ F.) and pressure (atmospheric), urethane rubbers which solidify in one stage from a liquid state; it is still a further object to provide liquid reaction mixtures of polymeric polyols and polyisocyanates which display great improvement in their behavior relative to the rate of cure and to the predictability of the properties produced in the solid state under varying temperature and humidity conditions as compared to similar prior art mixtures. Other objects and advantages will appear as the description proceeds.

Presently preferred divalent mercury containing compounds are the soluble mercuric salts of organic acids and ionizable monoorgano-mercuric compounds (which contain only one carbon-to-mercury bond). Examples of the first group of compounds are mercuric salts of carboxylic acids of intermediate carbon chain lengths, as for example the salts of carboxylic acids from 2 to about 18 carbon atoms; among these salts, mercuric octoate appears to provide optimum catalysis; salts of aromatic carboxylic acids are also useful.

Ionizable organo-mercuric compounds are preferred as these have not only been found to be more effective catalysts in smaller quantities than the mercuric salts, but, perhaps more importantly, these organo-mercuric compounds have been found to perform well as co-catalysts with lead compounds and to more positively inhibit side reactions with water of the reaction mixture as the mixture reacts to form a solid polymer. Among this group are organo-mercuric acetate, borate, benzoate, methacrylate, hydroxide, phthalate, gluconate, salicylate, octoate, stearate, etc.; the organo substituent may be an open or closed chain organic radical which is inert to isocyanate-active hydrogen reactions, as for example an aryl or alkyl group. Other organo-mercuric compounds which have been found to provide effective catalysis are the organo-mercuric substituted ammonium salts as for example di-(phenyl mercuric) substituted ammonium ([φHg)₂NH₂]⁺) phenate, glycolate, ethylene diamine tetra acetate, benzene sulphonate, sulphonate, maleate, etc.

Divalent mercury containing compounds to be useful as catalysts in the practice of this invention should be soluble in the organic polyhydroxy compound in an amount sufficient to catalyze the reaction and enable it to go to completion within a reasonably short time. The amount of the divalent mercury compound necessary to catalyze the reaction mixture is usually extremely small and in the case of mono-organic mercury compounds the solubility can be as little as one part organo-mercuric compound in about 10,000 parts of the polyol to be reacted with the polyisocyanate; in the case of mercuric salts of carboxylic acids the solubility level should be at least about one part catalyst per thousand parts polyol as these latter compounds are not as effective in small quantities to the same degree as the mono-organo-mercuric compounds. Although effective in amounts as small as 0.01% by weight of the polyol, a preferred range under ambient curing conditions for the organo-mercuric compounds has been found to be from about 0.1% to about 1% (as a percentage of the weight of the polyol) utilizing the mercuric salts of carboxylic acids the preferred percentage is from about ½ of 1% to 2%. While greater amounts can be used, they are not necessary.

In the formation of solid rubbers, the NCO— and —OH group containing reactants should be combined to provide approximately equal numbers of these groups, a ratio of about 0.9:1 to about 1.1:1 separate —NCO to —OH respectively being generally adequate to provide reasonable product control. While the reaction mixtures may contain less than equal or excess NCO groups and still provide a stable, solid rubber, when the excess is more than about 20%, or the deficiency more than 10%, control of the rubber properties becomes extremely difficult to maintain since the course of the side reactions provided by the excess NCO— or —OH groups is not entirely predictable. However, in the preparation of saturants or impregnants, etc. a 40% excess of one reactant over the other may be tolerated.

Preferred organic polyisocyanates are the aromatic polyisocyanates ordinarily used in urethane chemistry such as the moderately hindered arylene diisocyanates as for example the toluene diisocyanate isomers. However, unhindered diisocyanates such as 4,4'-biphenylene diisocyanate and extremely, strongly, sterically hindered diisocyanates such as 3,3-dimethoxy, 4,4'-biphenylene diisocyanates, and durene diisocyanate are also useful in the practice of the invention. Triisocyanates, and higher polyisocyanates can also be used; for example, a triisocyanate can be readily formed by the reaction of an excess of toluene diisocyanate with trimethylol propane. Aliphatic polyisocyanates can also be used.

Useful polyhydroxy compounds are those acid-free organic polyols having end groups containing activating members valence bonded to carbon atoms which carbon atoms are alpha or beta to carbon atoms carrying primary or secondary hydroxyl groups. Pictorially these end groups may be illustrated as follows:

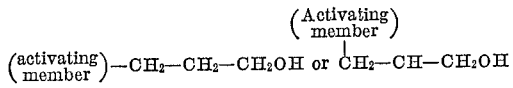

The activating member may be any member selected from the group consisting of OH, S, O, and N. Any remaining valences of the activating members not bonded to the carbon atom of the end group to which the activating member is attached is preferably satisfied by a further carbon atom; however, when a nitrogen activating member forms a part of an amide linkage one of the nitrogen values can be satisfied by hydrogen. It is preferred that such free valences be bonded to a carbon atom wherein the remaining valences of such carbon atom are satisfied by hydrogen, carbon, or by a combination of hydrogen and carbon atoms.

In the event the activating member is attached to the alpha or beta carbon atom by means of a single valence bond, it is preferred that such alpha or beta carbon atom should have at least one hydrogen atom valence bonded thereto in order that the activating member may function best in the practice of the invention.

Examples of useful polyols falling within the foregoing definition are the lower alkylene glycols such as ethylene glycol, propylene glycol, 1,2- 2,3-, and 1,3-butylene glycol, etc. and the polyalkylene ether glycols such as the polyethylene and polypropylene glycols and the higher glycols of the type noted which would provide an activating member alpha or beta to a primary or secondary hydroxyl in the polymer end groups.

Other examples are hydroxyl terminated polyesters made from condensing polycarboxylic acids such as adipic, terephthalic, sebacic, maleic, succinic, etc. with ether glyols such as ethylene glycol or higher alkylene and polyalkylene ether glycols to provide the requisite activating member-containing end groups. Another group of polyols useful in the practice of the invention are the celluloses and cellulosic derivatives. However, for economic reasons and to assure the production of polymers having extremely good water resistance and other desirable properties the polymeric polyalkylene ether glycols form a preferred group of polyols, particularly polypropylene ether glycols having average molecular weights from about 750 to about 4000, and preferably those having molecular weight averages no greater than about 2500.

The invention is further illustrated by the examples following. The polyol and polyisocyanate parts of the mixture are kept separate, of course, before mixing and as a convenience any fillers, pigments, reinforcing agents, etc. desired in the product as well as the catalyst are incorporated into the polyol so that a two-part system is provided with each part being storage stable.

EXAMPLE 1

Liquid reaction mixtures of the urethane composition noted hereinafter were hardened in the presence of various catalysts to illustrate the degree of product control provided by mercury catalysts in the presence of moisture in the reaction mixture as compared with the degree of product control provided by prior known catalysts used to catalyze the hardening of these liquid reaction mixtures to a solid state.

FORMULATION

Part A

|  | Percent |
|---|---|
| Polypropylene glycol (2025 M.W. average) | 25 |
| Polypropylene glycol (1025 M.W. average) | 25 |
| Calcined clay (Glomax PVR—trade name of Georgia Kaolin Company, Elizabeth, N.J. | 50 |

Part B

|  | Percent |
|---|---|
| Tolylene diisocyanate (80:20 2,4 and 2,6 isomers) | 90 |
| Trimethylol propane | 10 |

Part A of the formulation was dried by azeotropic distillation with toluene in vacuo to a dryness of less than about 0.05% water as determined by Carl Fisher titration. Part B is anhydrous by nature.

Thereafter Part A was divided into a number of separate portions and in each of these portions a catalyst was dissolved. Then, each portion of Part A was mixed with a portion of Part B with agitation for about 1 minute to provide a liquid reaction mixture and the liquid then poured into a shallow, open pan mold. The parts were combined in each liquid mixture to provide one group of liquid mixtures having an —NCO to —OH ratio of about 1.05:1 and a second group having an —NCO to —OH ratio of about 0.95:1.

After pouring into the pan molds the reaction mixtures were allowed to stand for about 40 hours at normal room temperature (about 70° F.) at a relative humidity of the surrounding atmosphere of about 10%.

These products were compared then with identical products which distinguished therefrom only by the addition of 1/10 of 1% water (by weight) to the Part A of each reaction mixture prior to mixing. The results are shown in the following table.

Part A

| | Percent |
|---|---|
| Polypropylene glycol (2025 M.W. average) | 26.8 |
| Polypropylene glycol (1025 M.W. average) | 24.5 |
| Calcined clay (Glomax PVR) | 48.2 |
| Catalyst | 0.5 |

Part B

| | Percent |
|---|---|
| Tolylene diisocyanate (80:20, 2,4 and 2,6 isomers) | 90 |
| Trimethylol propane | 10 |

Reaction mixtures of these parts were prepared with ratios of NCO/OH of 1.05:1 and 0.95:1. Prior to mixing, the catalyst was dissolved in Part A. Also, before mixing controlled amounts of water were added to Part A of each reaction mixture so that the effect of this added water could be ascertained upon curing of the reaction mixtures to a solid state. Cures were effected by heating the reaction mixtures to 65° C. for 12 hours and thereafter allowing them to set for one week at room temperatures.

TABLE II

| | Durometer | | | | | | | |
|---|---|---|---|---|---|---|---|---|
| | NCO/OH=1.05 | | | | NCO/OH=0.95 | | | |
| Water added, as percent Part A | 0 | 0.1 | 0.2 | 0.3 | 0 | 0.1 | 0.2 | 0.3 |
| Catalyst: | | | | | | | | |
| Phenyl mercuric acetate | 72 | 72 | 70 | 66 | 49 | 49 | 44 | 41 |
| Lead octoate | 71 | 61 | 44 | 14 | 44 | 36 | 22 | 4 |

As is apparent from this table, each tenth percent water added to Part A of each reaction mixture significantly

TABLE I

| | | | Hardness Shore A₂ | | | |
|---|---|---|---|---|---|---|
| | | | NCO/OH=1.05 | | NCO/OH=0.95 | |
| Catalyst | Amount as a percent of Part A | Gel time,[1] minutes | Dry <0.05% H₂O | 0.1% H₂O added | Dry <0.05% H₂O | 0.1% H₂O added |
| Phenyl mercuric acetate | 0.3 | 5 | 79 | 78 | 66 | 65 |
| Mercuric octoate | 1.0 | 9 | 78 | 76 | 64 | 60 |
| Lead octoate | 0.3 | 11 | 76 | 55 | 62 | 40 |
| D'butyl tin dilaurate | 2.0 | 15 | 72 | 45 | 60 | 33 |
| Triethylene diamine | 1.0 | 10 | 68 | 40 | 40 | 20 |

[1] For anhydrous sample.

As will be noted, the lead and phenyl mercuric catalysts were considerably more powerful than the other catalysts, both providing short gel times with very small amounts of catalyst as compared to the other catalysts used.

More significantly, from the table it is clearly apparent that neither the phenyl mercuric acetate catalyzed product nor the mercuric octoate catalyzed product were significantly affected in their final hardness by the addition of water to the reaction system. Yet, all of the other reaction systems to which water was added provided, in the final product, rubbers from 21 to 28 durometer points softer than did the completely anhydrous systems. This tremendous disparity was occasioned by the addition of only 1/10 of 1% water to the polyol part of the reaction mixture. Thus, from the standpoint of the total reaction mixture liquid, less than 1/10 of 1% water had been added. This graphically illustrates the inhibiting effect provided by divalent mercury compounds as catalysts against the incidence of undesirable side reactions of the isocyanate groups in the presence of water.

EXAMPLE 2

Since the lead octoate was found to be the best of the catalyst group against which the mercuric compounds were compared, comparative tests between the phenyl mercuric acetate and the lead octoate were carried out utilizing the following formulations:

decrease the final hardness of the lead octoate cured rubbers, the difference between 1/10 of 1% water and 2/10 of 1% water resulting in a durometer loss of 10 points in the lead octoate. As the amount of water is increased above 2/10 of 1%, the durometer loss in the lead octoate catalyzed systems becomes so high as to seriously affect the physical properties of the resultant solid. At 3/10 of 1% the cured rubber is seen to have degenerated to a point where it's practically valueless; whereas with the same water additions the phenyl mercuric acetate catalyzed rubber displays a durometer loss, even at 3/10% of only 6 points in the one instance and 8 points in the other.

EXAMPLE III

This example shows the effects of atmospheric humidity during curing of the liquid reaction mixtures catalyzed with various soluble metal catalysts. The reaction mixtures were all liquid products of the combination of the following two parts:

Part A

| | Percent |
|---|---|
| Polypropylene glycol (2025 average M.W.) | 25 |
| Polypropylene glycol (1025 average M.W.) | 25 |
| Calcined clay (Glomax PVR) | 50 |

Part B

| | |
|---|---|
| 80:20 2,4- and 2,6-tolylene diisocyanate isomers | 90 |
| Trimethylol propane | 10 |

The reaction mixtures were combined to provide one group with an NCO/OH ratio of 1.1:1 and a second group of 1.05:1.

comprises about 90% of the mixture) was at the curing temperature whereas Part B was at about room temperature. Mixing time was approximately one minute and the

TABLE III

| Catalyst | Amount, percent of Part A | Gel time, minutes | Humidity (relative), percent | Shore $A_2$ Hardness | | | | | 65° C., post cure |
|---|---|---|---|---|---|---|---|---|---|
| | | | | Room temperature | | | | | |
| | | | | 1 hr.[1] | 4 hrs.[1] | 12 hrs.[1] | 33 hrs.[1] | 80 hrs.[1] | 24 hrs.[1] |
| Phenyl mercuric acetate | 0.3 | 5.5 | 20 | 75 | 76 | 77 | 79 | 79 | 77 |
| | | | 100 | 74 | 76 | 77 | 76 | 76 | 75 |
| Lead octoate | 0.4 | 5.5 | 20 | 20 | 58 | 67 | 70 | 74 | 75 |
| | | | 100 | 20 | 51 | 61 | 64 | 65 | 67 |
| Phenyl mercuric acetate | 0.2 | 11 | 20 | 70 | 77 | 78 | 79 | 79 | 78 |
| | | | 100 | 70 | 76 | 75 | 75 | 75 | 74 |
| Lead octoate | 0.2 | 15 | 20 | Gelled | 25 | 52 | 60 | 71 | 75 |
| | | | 100 | Liquid | 0 | 38 | 49 | 50 | 55 |

[1] Curing times.

With reference to the foregoing table, the 65° C. column indicates that the solid product was post cured at 65° C. for 24 hours after the 80 hours at room temperature. In all cases in the foregoing table the NCO/OH ratio was 1.1:1. With the phenyl mercuric acetate, the liquid reaction mixture had solidified to a hard rubber at the end of one hour both under the 20% and the 100% relative humidity conditions, and this hardness remained substantially unchanged throughout the remaining 79 hours at room temperature and subsequent 65° C. post curing cycle, indicating complete reaction of the reactive groups and consequent stability of the hardened product.

On the other hand the lead octoate catalyzed systems, even at a relatively high level of lead octoate to provide an identical gel time to the 3/10 of 1% phenyl mercuric acetate catalyzed system, failed to reach final hardness until the 80 hour period was up at 20% humidity and did not reach this hardness at all under 100% humidity even with a subsequent 65° C. post cure cycle. With other catalysts the results are generally even poorer.

When lesser amounts of the phenyl mercuric acetate and lead octoate were used, the phenyl mercuric acetate still displayed almost complete curing at the end of only 4 hours, achieving a stable hardness which thereafter did not change even after 80 hours and a 24-hour post cure at 65° C. On the other hand, the lead octoate, at the 100% humidity failed to even approach a cure throughout the curing cycle, including the post curing cycle, and even at 20% humidity did not achieve a final hardness of 75 durometer until after 80 hours at room temperature, and 24 more hours at 65° C. Consequently, when it is to be considered that the lead octoate has in the past been considered the preferential catalyst for this kind of a one-shot rubber system, the difference in product consistency with even varying relative humidities becomes quite apparent. The absence of these differences when the mercuric compounds are used as catalysts is startlingly apparent.

EXAMPLE 4

This example shows the superiority of the mercuric compounds as catalysts in rubber formation even through considerable temperature variations.

The formulation of the reaction mixture was as follows:

| Part A | Percent |
|---|---|
| Polypropylene glycol (2025) | 25 |
| Polypropylene glycol (1025) | 25 |
| Calcined clay (Glomax PVR) | 50 |

| Part B | |
|---|---|
| 80:20 tolylene diisocyanate | 86.7 |
| Polypropylene oxide extended trimethylol propane (TP 446) to provide an equivalent weight of 142 for each hydroxyl group | 6.0 |
| Trimethylol propane | 7.3 |

Parts A and B were mixed with agitation to provide an NCO/OH ratio of about 1:1. At mixing, Part A (which liquid reaction mixtures were then poured into pre-cooled pan molds (or preheated where necessary) to the desired curing temperature. In each instance the catalyst had been dissolved in Part A prior to bringing Part A to the mixing and curing temperature.

The results are set forth in the table following:

TABLE IV

| Catalyst | Amount, (percent Part A) | Gel time minutes | Hours to reach 60 durometer, (Shore $A_2$) | | | |
|---|---|---|---|---|---|---|
| | | | 3° C. | 21° C. | 25° C. | 41° C. |
| Phenyl mercuric acetate | 0.3 | 5.5 | 12 | ½ | ⅓ | ⅙ |
| Lead octoate | 0.3 | 4.5 | [1]100 | 6 | 3 | 1 |

[1] Estimate.

As is apparent from the table, over a temperature span of about 40° the curing time spread of the phenyl mercuric acetate catalyzed reaction mixture to achieve a 60 durometer hardness was less than 12 hours whereas the lead octoate catalyzed reaction mixture, even on an estimated basis since cure was not actually achieved, would have required at least 100 hrs. to cure to a 60 durometer state at 3° C. indicating at least about a 99-hour variation in curing time during the 40° temperaure span.

EXAMPLE 5

Divalent mercury compound catalyzed reaction mixtures have been found to possess a longer induction period to permit mixing of the reactants in forming the liquid reaction mixture than similar reaction mixtures catalyzed with other soluble metal compounds. The mercury catalyzed systems remain very fluid (low viscosity) during mixing and prior to pouring giving the operator a long period of time to assure uniformity of mixing, followed by very rapid viscosity rise to achieve quick gelation. A more steady rapid viscosity rise of systems catalyzed with other soluble metal compounds appears to occur so that the mixtures thicken more rapidly, thereby allowing shorter mixing and pouring times. As is apparent from the examples preceding, this better and longer mixing ability of the divalent mercury compound catalyzed systems is not gained at the expense of longer gel or curing times inasmuch as the mercury catalyzed systems appear to, in general, cure to their final properties more readily and under a wider range of temperature and humidity conditions than reaction systems catalyzed by other soluble metal compounds.

To illustrate this premise, Part A and Part B of a reaction system were mixed in a ratio of NCO/OH of about 1:1. Each Part A was composed of polypropylene glycol (2025), calcined clay, and catalyst. One Part A contained a lead octoate catalyst, and the other Part A contained a phenyl mercuric hydroxide catalyst. The viscosity of each Part A at 25° C., as measured by a Brookfield viscosimeter, using a number 4 spindle at 30 r.p.m., was between 5600 and 5700 centipoises. Part B was the same as that of the example preceding.

Part A and Part B of each batch was mixed in a machine mixer so that the residence time in the mixer of any given portion of the reaction mixture would be less than 10 seconds; the machine was run under the same conditions for each batch. Thus, the mixing time for each mixture was about 10 seconds. After mixing, the resultant liquid was poured into measuring vessels and viscosity readings taken, the time lapse between mixing and the first viscosity reading being 30 seconds, providing a mixing and pouring time of about 40 seconds. The times in the table following begin with pouring the mixtures into the measuring vessels.

TABLE VI

| Sample | Initial | | Five launderings | |
|---|---|---|---|---|
| | Oil | Spray | Oil | Spray |
| A | | 50 | | |
| B | | 50 | | |
| C | | 80 | | |
| D | 100 | 80 | 0 | 0 |
| E | 100 | 80 | 50 | 05 |

Complete repellency is indicated by 100 and lack of any repellency is indicated by the zero rating. As can be seen from the foregoing table the phenyl mercuric octoate cata-

TABLE V

| Time in seconds | Viscosity reading, cps. (Brookfield viscosimeter #4 spindle, 6 r.p.m.) | | | | | | | Gel time, minutes |
|---|---|---|---|---|---|---|---|---|
| | 0 | 30 | 60 | 90 | 120 | 180 | 210 | |
| Catalyst: | | | | | | | | |
| Phenyl mercuric hydroxide | 3,000 | 3,200 | 3,700 | 4,500 | 6,000 | 13,000 | 21,000 | 15 |
| Lead octoate | 3,000 | 8,000 | 12,000 | 19,000 | 30,000 | 65,000 | | 11 |

As is apparent from the viscosity measurements, the phenyl mercuric hydroxide catalyzed reaction mixture remained at a lower viscosity for a longer period of time than the lead octoate catalyzed reaction mixture. Even more significantly the rise of the phenyl mercuric hydroxide cured reaction mixture was extremely slow for the first 60 seconds, still remaining in the 3,000 centipoise range, whereas the lead octoate catalyzed mixture in the same 60 seconds had progressed from 3,000 to 12,000 centipoises clearly indicating the longer induction time provided by the mercuric catalyzed systems. Even after 210 seconds the mercury compound catalyzed system approximates that of the lead octoate catalyzed system after 90 seconds. However, from the preceding examples, it is clear that this longer period of fluidity is not achieved at the expense of lengthened gel or cure times.

EXAMPLE 6

While the ionizable halogen free divalent mercury compounds, and particularly the monoorganic-mercuric compounds, soluble in polyol to the degree necessary to dissolve them, are valuable to catalyze the formation of rubbers from liquid reaction systems in a single stage, they are also valuable catalysts in the formation of urethane saturants for papers, textiles and other cellulosic materials. These catalysts appear to promote chemical reaction of the isocyanate groups with the cellulose hydroxyl groups, thereby chemically bonding the saturant to the fibers. Three octadecyl isocyanate solutions were prepared for comparison in treating 80 inch by 80 inch cotton swatches. Each solution was a 2% octadecyl isocyanate solution in 1,1,1 trichloroethane, the solutions being designated as follows:

| Solution | Composition |
|---|---|
| A | 2% octadecyl isocyanate. |
| B | 2% octadecyl isocyanate plus 0.02% triethylamine. |
| C | 2% octadecyl isocyanate plus 0.02% phenyl mercury octoate. |
| D | 1% $C_8F_{17}SO_2N(C_2H_5)C_2H_4OCONH-$ 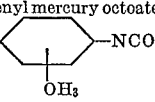 $-NCO$ plus 0.02 triethylamine. |
| E | 1% $C_8F_{17}SO_2N(C_2H_5)C_2H_4OCONH-$ 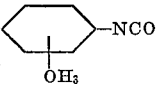 $-NCO$ plus 0.02% phenyl mercuric octoate. |

The cotton samples were soaked in these solutions and dried at 100° C. for 15 minutes thereafter. Then, the samples were checked for oil and water shedding ability.

lyzed saturants displayed consistently better oil and spray ratings than the uncatalyzed or the triethylamine catalyzed counterparts.

Evidence that the bond achieved by the phenyl mercuric octoate catalyzed saturant and the cotton was chemical was indicated by acetone extraction. When Sample D was extracted with cold acetone, oil and spray resistance was zero. Whereas when Sample E was extracted with boiling acetone for 3 hours in a Soxhlet extrator, the cloth sample retained an oil rating of 50 to 70.

EXAMPLE 7

The advantage of the monoorgano-mercuric compounds has yet another facet in that the ionizable organo-mercuric compounds act very readily as co-catalysts with the lead salts of carboxylic acids in catalyzing the cure to a solid state of liquid reaction mixtures of polyisocyanates and polyols where the reacting hydroxyl groups have an activating member on a carbon alpha or beta thereto. While the organo-mercuric compounds as has been seen from the foregoing examples work very efficiently as catalysts by themselves, these compounds are relatively expensive and it is desirable that they be used in the smallest amounts possible. I have discovered that a synergistic action takes place when organomercuric hydroxides and lead salts are used as co-catalysts. Thus, comparing various catalyst systems with the reaction mixture Part A

| | Percent |
|---|---|
| Polypropylene glycol (50:50 mixture of 1025 and 2025 molecular weight portions) | 50 |
| Calcined clay | 50 |

Part B

| | |
|---|---|
| 80:20 2,4- and 2,6-tolylene diisocyanate isomers | 90 |
| Trimethylol propane | 10 | wherein the catalysts are dissolved in Part A before mixing with Part B, the synergistic action of co-catalysts are illustrated in the table following:

TABLE VII

| Percent lead octoate | Percent phenyl mercuric hydroxide | Ge. time, minutes, Part A (0.3% H₂O) |
|---|---|---|
| 0.3 | | ∞ |
| 0.3 | 0.25 | 4½ |
| | 0.25 | 13 |

As is apparent from the table, a much lower concentration of both lead octoate and phenyl mercuric hydroxide can be used when the two are used together as a catalyst than when each is used separately. In fact, the lead salt, when used at the concentration level found useful when used with the organo-mercuric compounds, failed to gel the reaction mixture. Note, the 3/10 of 1% water in the Part A was present as a residue in the polyol formation. Further, when the organo-mercuric compound was used alone at a concentration of only ,25% a gel time of 13 minutes was obtained as contrasted with 4½ minutes when combined with the lead octoate.

This catalytic coaction is also apparent when lead oxide is included with a lead salt and a divalent mercury compound. Thus, utilizing a somewhat similar, but less reactive reaction mixture than that specified in the preceding part of this example, the following results were obtained.

TABLE VIII
[Catalyst, as percent of Part A]

| PbO | Pb (octoate)$_2$ | HgOH | Hg acetate | Hg (octoate)$_2$ | Gel time |
|---|---|---|---|---|---|
| 1.0 | | | | | ∞ |
| 1.0 | 0.3 | | | | >3 hours. |
| 1.0 | 0.3 | 0.25 | | | 7.5 minutes. |
| 1.0 | 0.3 | | 0.35 | | 6.5 minutes. |
| 1.0 | 0.3 | | | 0.25 | 30 minutes. |

The inclusion of the lead oxide is desirable since its presence enhances the storage life of the lead salt when the catalyst is carried as an ingredient of Part A of the reaction system.

EXAMPLE 8

In the preceding examples, formulations have been given wherein the cross-linking of the urethane polymer is provided by a tri-isocyanate, which is formed by reacting a minor portion of trimethylol propane with the TDI (tolylene diisocyanate) in the formation of Part B. It is not necessary that the cross-linking agent be part of the reactive poly-isocyanate; it can as well be built into the polyol side of the mixture, or it may be shared by both parts of the system.

A reaction mixture which has the trifunctionality built into Part A is as follows:

Part A

| | Percent |
|---|---|
| Polypropylene glycol, 2025 M.W. average | 27 |
| Trimethylol propane extended with propylene oxide | 25 |
| Litharge (lead oxide) | 0.3 |
| Phenyl mercuric acetate | 0.2 |
| Hexogen lead (lead octoate) | 0.1 |
| Clay | 45.4 |
| Pigment, antioxidant, etc. | 2.0 |

Part B

| | Percent |
|---|---|
| Tolylene diisocyanate | 67 |
| Polypropylene glycol, 2025 M.W. average | 17 |
| Tripropylene glycol | 16 |

Here, the tri-functionality for cross-linking is provided by the polyol side of the mixture. This reaction mixture has a gel time at room temperature of about 5–8 minutes and achieves a substantially complete cure within a matter of a few hours, reaching a stable durometer of about 70–75 Shear A$_2$ scale. The reaction proceeds even when the reactants are immersed in water without significant harmful effect on the cured product.

EXAMPLE 9

The significance of the presence of the activating members in the hydroxyl carrying end groups was demonstrated by the following procedure:

Reaction mixtures were prepared as solutions in dioxane of different monohydric alcohols with a tolylene diisocyanate and trimethylol propane adduct (10:1 TDI to TMP). To each 100 parts by weight of this solution was added about 1 part catalyst. In all instances, the 10:1 adducts were 80:20 mixtures of 2,4- and 2,6-isomers of tolylene diisocyanate.

In all of the mixtures, the maximum possible heat rise above room temperature for complete reaction was found to be about 34° C., as determined by running very fast reactions with total reaction times of about 10 seconds or less, and averaging out the heat rises. Comparisons with this 34° C. heat use figures of the heat rises noted in the table following give a fair indication of the influence of the actuating members on the catalysis.

TABLE IX

| | Heat rise in ° C. after 2 minutes | | |
|---|---|---|---|
| Alcohol | $C_2H_5OCH_2CH_2OH$ | $nC_4H_9OH$ | $C_2H_5SCH_2CH_2OH$ |
| Catalyst: | | | |
| None | 0 | 0 | 0 |
| Phenyl mercuric acetate | 29 | 10 | 29 |
| Mercuric naphthenate | 25 | 4 | 30 |

From the table it is apparent, even from these simple rate comparisons, that the activating influence of the catalysts is enhanced by the presence of the activating members adjacent the reactive hydroxyl groups, and that while catalysis is not dependent on their presence, it is enhanced thereby.

Many new and unexpected advantages in urethane rubber formation have been discovered through the use of divalent mercury catalysts. Rubbers cured from liquid reaction mixtures containing these catalysts have been found to possess tack free surfaces much more rapidly than the rubbers of the prior art; thus, mold separation is less of a problem, dust pick up is reduced and maintenance of clean surfaces facilitated. In curing in open molds, the mercuric catalyzed rubbers have greatly lessened an irritating problem of the prior art in that the build-up of a meniscus of unreacted material around the mold sides at the rubber surface is much less than heretofore observed. A most significant advantage is that mercuric catalyzed urethane rubbers cure in situ against wet concrete, leather and other similar surfaces and firmly adhere thereto; this was not possible with the prior art systems.

I claim:

1. A process for accelerating the urethane linkage forming reaction between isocyanate and hydroxyl groups in the formation of a urethane product, said process comprising reacting an organic compound having at least one reactive isocyanate group with an organic compound having at least one reactive hydroxyl group in the presence of a catalytic amount of an ionizable, halogen-free, monoorgano mercuric compound having a single carbon to mercury valence bond.

2. The process of claim 1 wherein said monoorgano mercuric compound is a phenyl mercuric compound.

3. The process of claim 1 wherein said monoorgano mercuric compound is a phenyl mercuric salt of a carboxylic acid.

4. A process for accelerating the urethane linkage forming reaction between isocyanate and hydroxyl groups in the formation of polymeric urethane products, which process comprises reacting aromatic polyisocyanate and polyalkylene ether polyol with one another in liquid reaction mixture in the presence of a catalytic amount of ionizable, halogen-free monoorgano mercuric compound having a single carbon to mercury valence bond.

5. A process for making a non-cellular polymeric polyurethane product comprising reacting organic polyisocyanate and organic polyol with one another in liquid reaction mixture having present therein a catalytic amount of an ionizable, halogen-free, monoorgano mercuric compound having a single carbon to mercury valence bond.

6. A process for making a non-cellular polymeric polyurethane product comprising reacting aromatic polyisocyanate and polyalkylene ether polyol with one another in liquid reaction mixture in the presence of a catalytic amount of a monoorgano mercuric compound having a single carbon to mercury valence bond, said polyol having an oxygen, sulfur, hydroxyl or nitrogen valence bonded to a carbon atom alpha or beta to a carbon atom of said polyol carrying a reactive hydroxyl.

7. The process of claim 6 wherein isocyanate and hydroxyl groups are present in approximately stoichiometric amounts.

8. The process of claim 7 wherein said mercuric compounds is a phenyl mercuric compound.

References Cited

UNITED STATES PATENTS

| | | | |
|---|---|---|---|
| 3,073,802 | 1/1963 | Windemuth et al. | 260—77.5 |
| 3,136,732 | 6/1964 | Kaestner et al. | 260—33.6 |
| 3,039,976 | 8/1959 | Barner | 266—77.5AG |

FOREIGN PATENTS

| | | |
|---|---|---|
| 692,953 | 6/1953 | Great Britain. |
| 208,961 | 10/1955 | Australia. |
| 160,814 | 1/1952 | Australia. |
| 706,906 | 3/1965 | Canada. |
| 1,351,045 | 12/1963 | France. |
| 962,553 | 4/1957 | Germany _____ 260—77.5AG |
| 23,040 | 9/1960 | Australia _____ 260—77.5AG |
| 23,041 | 9/1960 | Australia _____ 260—77.5AG |

OTHER REFERENCES

Shukis et al.: "Mercurials From Aliphatic Glycols published in 1943, Journal of American Chem. Soc., vol. 65, pages 2365–2366, copy available in Scientific Library.

Journal of Applied Polymer Science, vol. IV, No. 11, pages 207–211.

Mobay T.I.B. 28F9, July 20, 1959, Technical Bulletin of Mobay Chemical Co.

Journal of Polymer Science, vol. 52, page 306, at Table 5, July 1961.

DONALD E. CZAJA, Primary Examiner

M. J. WELSH, Assistant Examiner

U.S. Cl. X.R.

260—2.5AB, 75NB, 482B, 482C